United States Patent [19]

Kain

[11] Patent Number: 4,754,999
[45] Date of Patent: Jul. 5, 1988

[54] CHILD'S CAR SEAT/BOOSTER SEAT

[75] Inventor: James M. Kain, Tipp City, Ohio

[73] Assignee: Spalding & Evenflo Companies, Inc., Tampa, Fla.

[21] Appl. No.: 917,456

[22] Filed: Oct. 10, 1986

[51] Int. Cl.⁴ .............................................. A47C 1/08
[52] U.S. Cl. .................................... 297/250; 297/317; 297/320; 297/487; 297/488
[58] Field of Search ............... 297/250, 253, 254, 487, 297/488, 467, 317, 320, 341

[56] References Cited

U.S. PATENT DOCUMENTS

| | | | |
|---|---|---|---|
| 664,542 | 12/1900 | Firnhaber | 297/487 X |
| 1,964,519 | 6/1934 | Knudsen | 297/317 X |
| 3,124,388 | 3/1964 | Berlin | 297/320 |
| 3,155,425 | 11/1964 | Chreist Jr. | 297/250 |
| 3,578,382 | 5/1971 | Servadio | 297/390 |
| 3,700,281 | 10/1972 | Servadio | 297/390 |
| 3,767,259 | 10/1973 | Blake et al. | 297/250 |
| 3,841,657 | 10/1974 | Ewert et al. | 280/150 SB |
| 3,934,934 | 1/1976 | Farrell, Jr. et al. | 297/250 X |
| 4,343,510 | 8/1982 | Cone | 297/250 |
| 4,376,551 | 3/1983 | Cone | 297/250 |
| 4,429,916 | 2/1984 | Hyde et al. | 297/250 |
| 4,449,752 | 5/1984 | Yasumatsu et al. | 297/341 |
| 4,500,133 | 2/1985 | Nakao | 297/250 |
| 4,545,617 | 10/1985 | Drexler et al. | 297/320 X |
| 4,568,122 | 2/1986 | Kain | 297/488 |
| 4,579,191 | 4/1986 | Klee et al. | 297/488 X |
| 4,591,208 | 5/1986 | McDonald et al. | 297/250 X |
| 4,603,903 | 8/1986 | Moscovitch | 297/250 |
| 4,613,188 | 9/1986 | Tsuge et al. | 297/250 |
| 4,632,456 | 12/1986 | Kassai | 297/250 X |
| 4,662,683 | 5/1987 | Knoedler et al. | 297/487 X |

FOREIGN PATENT DOCUMENTS

| | | | |
|---|---|---|---|
| 527329 | 5/1931 | Fed. Rep. of Germany | 297/317 |
| 3430198 | 8/1985 | Fed. Rep. of Germany | 297/250 |
| 5566 | of 1901 | United Kingdom | 297/488 |

OTHER PUBLICATIONS

Brochure entitled "Juvenile Products 1985," Cosco, p. 5.

Primary Examiner—Kenneth J. Dorner
Assistant Examiner—Laurie K. Cranmer
Attorney, Agent, or Firm—Donald R. Bahr; John E. Benoit

[57] ABSTRACT

A child's car seat is disclosed which consists of two basic parts, the first comprising a base, frame, and back, and the second consisting of a seat removably secured to the base adjacent the back whereby, when the seat is secured to the base, a child's car seat is provided for infants and small toddlers and, when the seat is removed from the base, a booster seat is provided for larger children. The seat includes a split shield secured to the seat portion so as to be used in both the car seat and booster seat configuration. A harness, including a crotch strap, is provided for use when the car seat configuration is used.

17 Claims, 6 Drawing Sheets

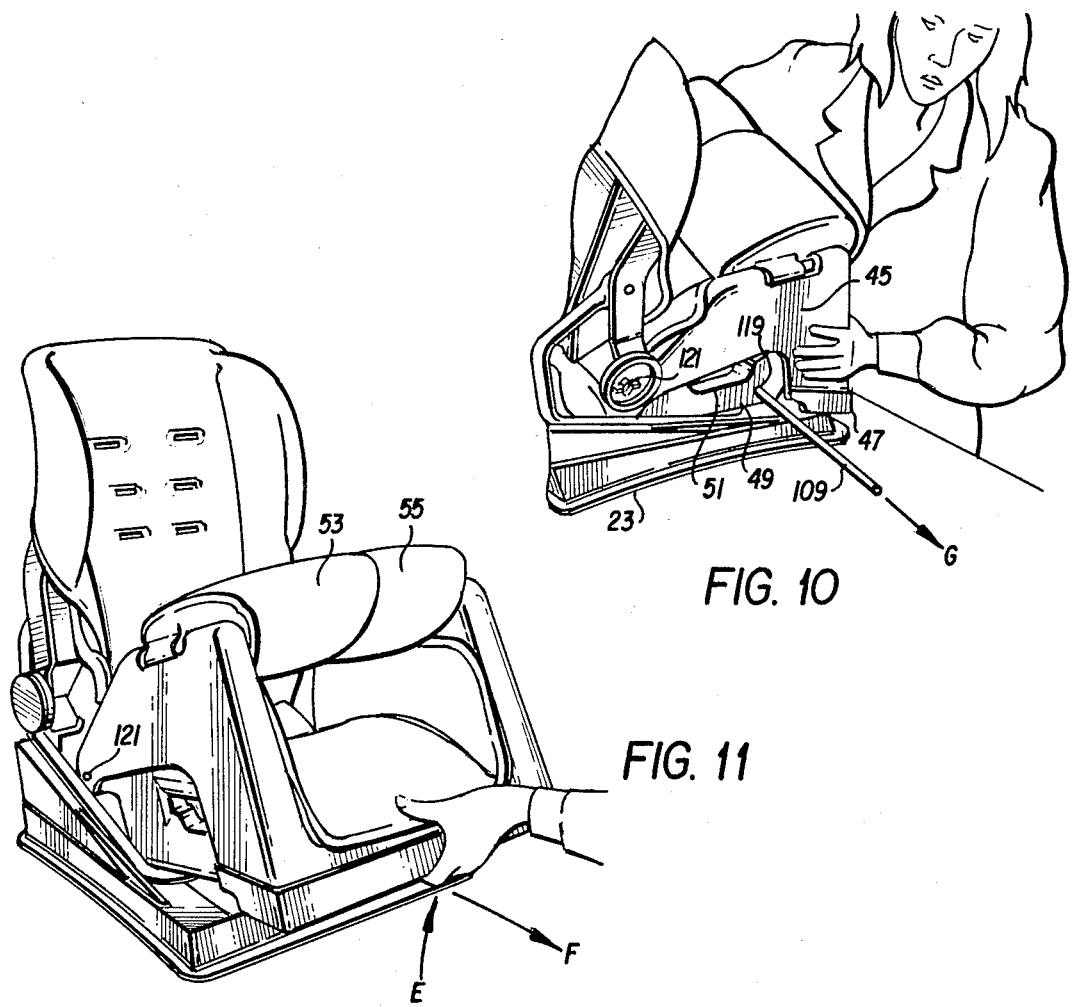
FIG. 10
FIG. 11
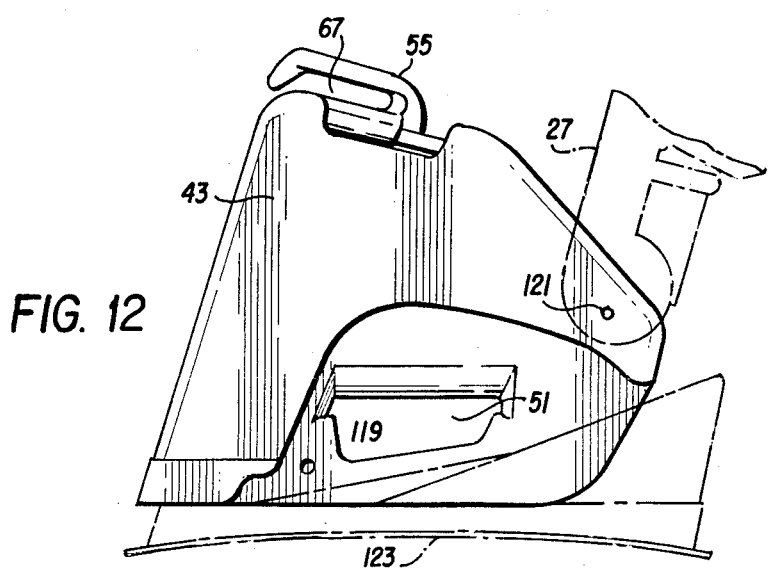
FIG. 12

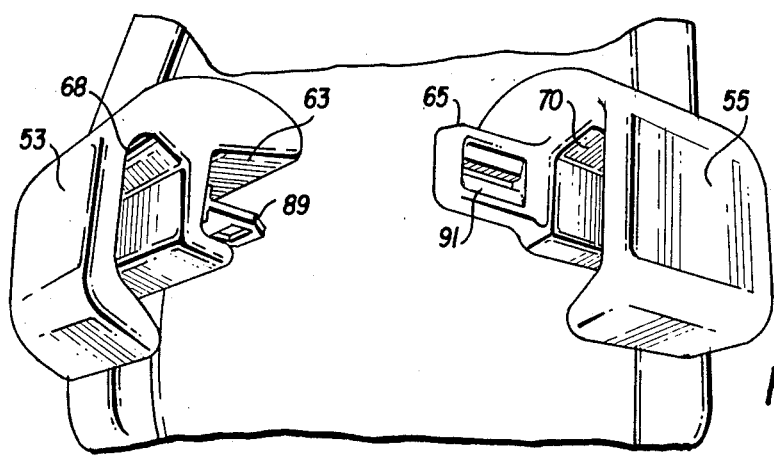
FIG. 14
FIG. 15
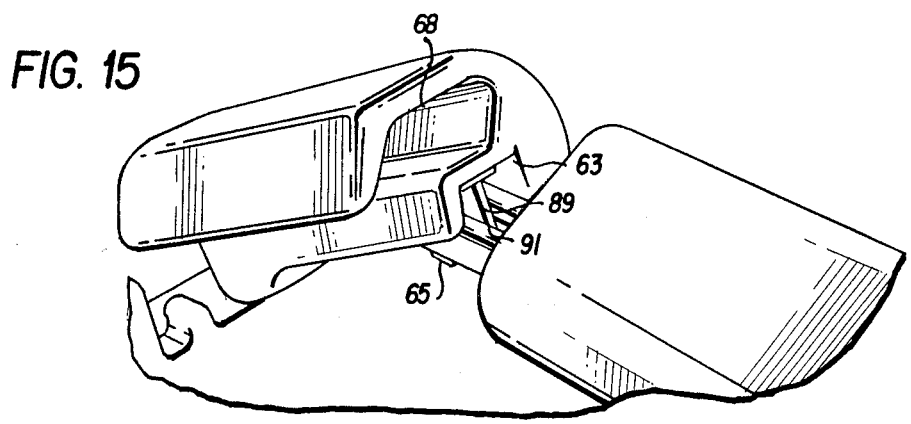
FIG. 16
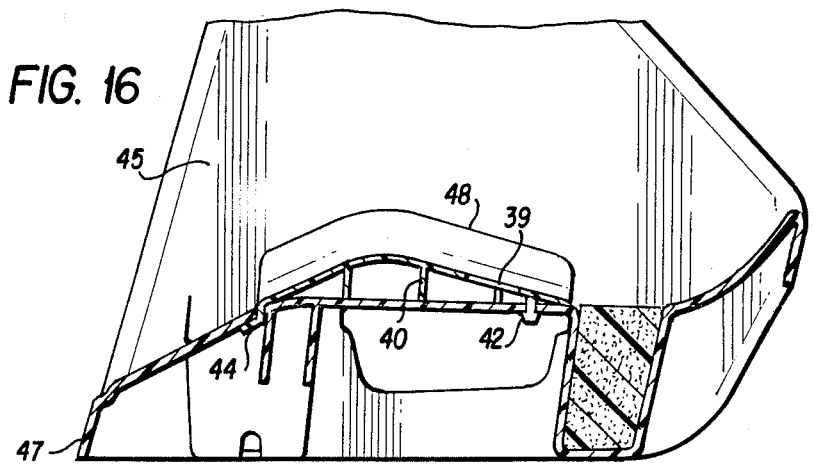

CHILD'S CAR SEAT/BOOSTER SEAT

The present invention is directed broadly to a child's car seat and, more specifically, to a car seat which is easily convertible to a booster seat so as to provide proper seating protection for children from infancy through the years that they will require such seating in a standard automobile.

BACKGROUND OF THE INVENTION

Car seats in many forms are available today and are, indeed, required by most states as a matter of law for use with children who are of a size such that a standard auto belt arrangement does not afford proper protection.

One such car seat is shown in U.S. Pat. No. 4,376,551, issued Mar. 15, 1983, and assigned to the present assignee. This car seat uses a restraining system which includes a harness cooperating with a padded shield, with the shield being biased in a particular manner so as to prevent misuse of the car seat. This type of seat meets all government standards as to safety and is appropriate for children from toddler up to a particular size, at which time the child becomes too large to fit the seat, but is still too small to properly use the restraining systems of standard automobiles--that is, the seat and/or harness shoulder straps in these systems.

In order to provide a means for protecting the older child properly, booster seats are available. One such booster seat is shown in U.S. Pat. No. 4,568,122, issued Feb. 4, 1986, and is assigned to the assignee of the present application. This booster seat includes a base and seat with a split shield openable for access, with the shield being closed when the child is in place. The shields have channel which accepts the auto belt of the standard car so as to retain the booster seat in position on the seat of the automobile.

The above systems necessitate the purchase of two separate units as the child is growing. The car seat, itself, as described above, becomes obsolete after the child reaches a certain age. The child is unable to use the harness system of the automobile and, therefore, it is necessary to purchase a booster seat for such a child. Obviously, this presents an additional expense in view of the necessity of the two separate purchases.

It is an object of the present invention to provide a car seat which is useable over the entire term that a child needs such a seat. By providing a car seat which has a detachable booster seat which is an integral part of the car seat when it is attached, the life and use of the car seat extends over the entire period of time during which the child requires such a seat.

BRIEF DESCRIPTION OF THE INVENTION

The present invention provides a child's car seat which consists of two basic parts. The first part comprises a base, frame, and back; the second part comprises a seat removably secured to the base adjacent the back whereby, when the seat is secured to the base, a child's car seat is provided for infants and small toddlers and, when the seat is removed from the base, a booster seat is provided for larger children. The seat includes a split shield secured to the seat portion so as to be used in both the car seat and booster seat configuration. A harness, including a crotch strap, is provided for use when the car seat configuration is used.

BRIEF DESCRIPTION OF THE DRAWINGS

FIGS. 10 and 11 perspective views illustrating the means for removing the seat section from the car seat;

FIG. 12 is a side elevational view showing the booster seat removed from the car seat structure;

FIG. 14 is a partial perspective view of the shield structure in a partially open position;

FIG. 15 is a partial perspective view of the shield structure in a partially closed position; and FIG. 16 is a sectional view taken along the lines 16—16 of FIG. 4.

DETAILED DESCRIPTION OF THE DRAWINGS

Figure 1:
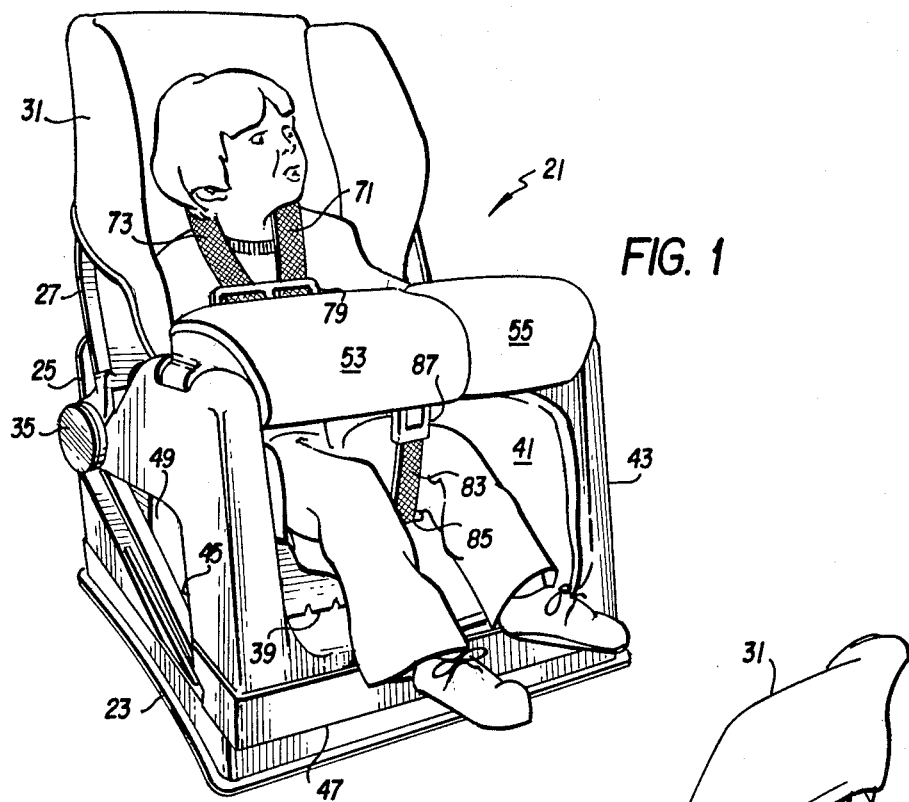
FIG. 1 is a perspective view of the car seat of the present invention when used with infants and toddlers.
Figure 2:
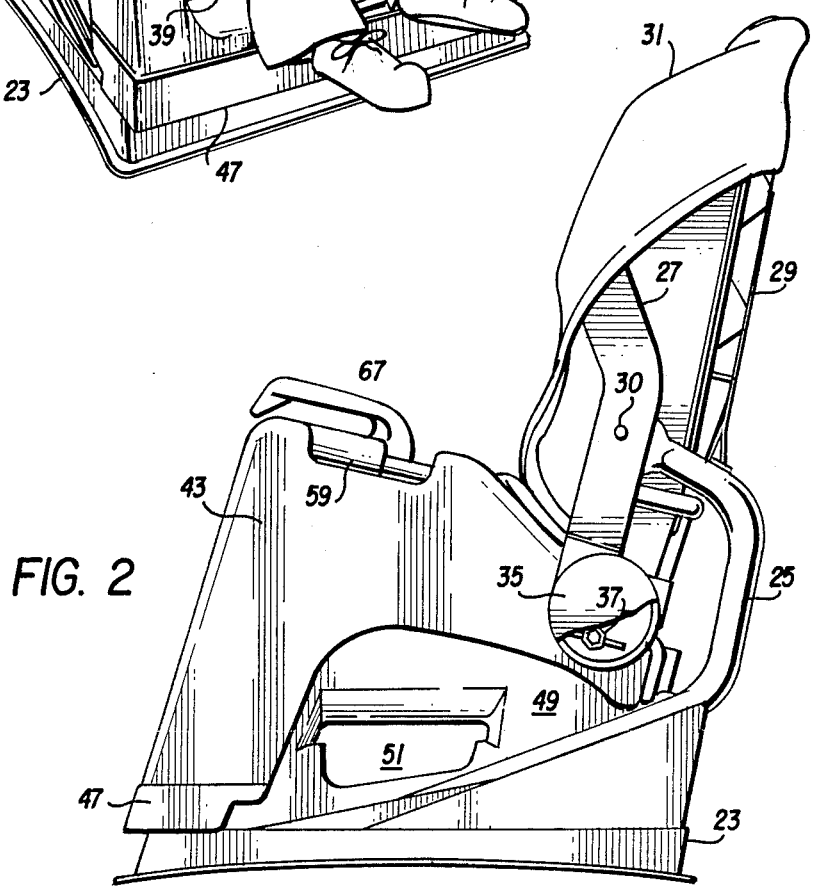
FIG. 2 is a side elevation view of the car seat of FIG. 1.
Figure 3:
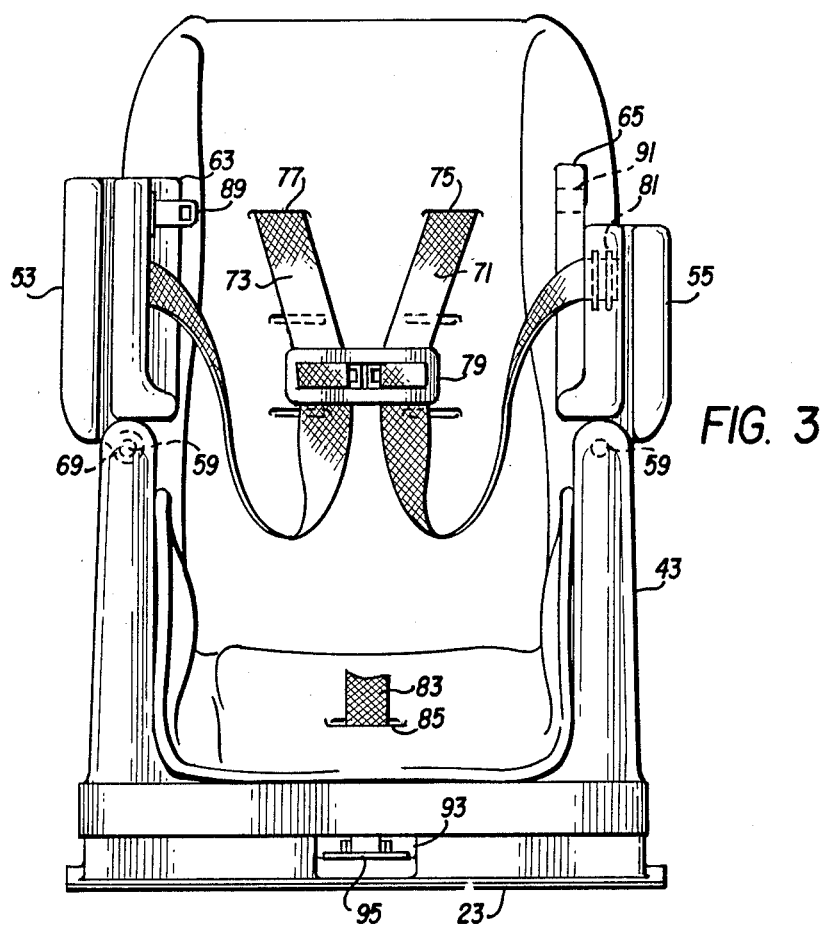
FIG. 3 is a front elevation view of the car seat of FIG. 1.

Turning now to FIGS. 1, 2, and 3, there is shown a car seat 21 having base 23, lower frame 25, and upper support arm 27. Back rest 31, having padding thereon, extends upwardly and is supported by arm 27, which is pivotally connected to support arm 27 at pivot 30. Removable cap 35 covers a pivot bolt 37 for reasons which will be described in detail as the description proceeds.

The seat includes a removable plastic seat shell insert 39. This seat insert is of a depth such that it raises the very small child in the seat so as to accommodate the seat to such a size. If the insert is not needed as the child grows, it may easily be removed and stored. The details of the seat shell insert are shown in FIG. 16, which illustrates structural struts 40. Snapin tab 42 and flange 44 removably retain the shell in place; with the shell being covered by padding 48.

The seat portion, which will hereinafter be referred to as "booster seat" 41, consists of side panels 43 and 45 and seat base 47. Base 47 is integral with rear base 49 which extends therefrom. Channel 51 extends through rear base 49 for purposes which will described subsequently.

A split shield comprising shields 53 and 55 are rotatably mounted on rod 59 and are also slidable on rod 59. The sliding provision accommodates children of different weights since it is desirable to have the shield substantially adjacent to the child.

Referring more particularly to FIG. 3, spring 69 is secured to rod 59 and shield 53 so as to bias shield 53 in the upper position, as shown in FIG. 3. This spring assures that the shield must be in the down position and held there by the crotch strap, as explained subsequently, in order for the seat to be used. This prevents misuse by the adult placing the child in the seat. Shields 53 and 54 are constructed so as to include a tunnel 67 for particular use with the auto seat belt when only the booster seat is used, as will be discussed below.

Shield 53 includes a recessed area 63 in the underside thereof which mates with flange 65 extending from shield 55 when the two shield portions are in the position, as indicated in FIG. 1 and further illustrated in FIGS. 14 and 15.

Shoulder harnesses 71 and 73 are secured at one end to the rear of the back of the car seat and pass through slots 75 and 77, FIG. 3. The shoulder straps are then held in a relatively close position by means of a harness tie/web slider 79 and extend therethrough. The terminal ends of the harness are removably secured to the underside of the respective shields by any well known securing means 81.

Crotch strap 83 passes through slot 85 in the booster seat section and terminates in female connection 87 of a standard seat belt latch. The male part of the latch consists of a plate 89 extending downwardly from shield 53. In operation, shield 55 is first lowered and then shield 53 is lowered so that plate 89 passes through slot 91 in flange 65. When the shields are in closed position, female section 87 is then mated with male plate 89 so as to secure the crotch strap to the shields and to secure the shields in a closed position.

Figure 4:
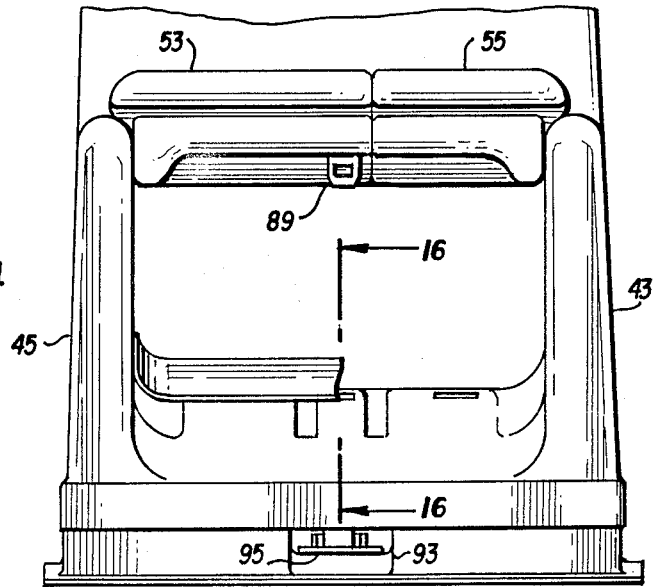
FIG. 4 is a partial front elevation view of the car seat of FIG. 1 with the shields in place.
Figure 5:
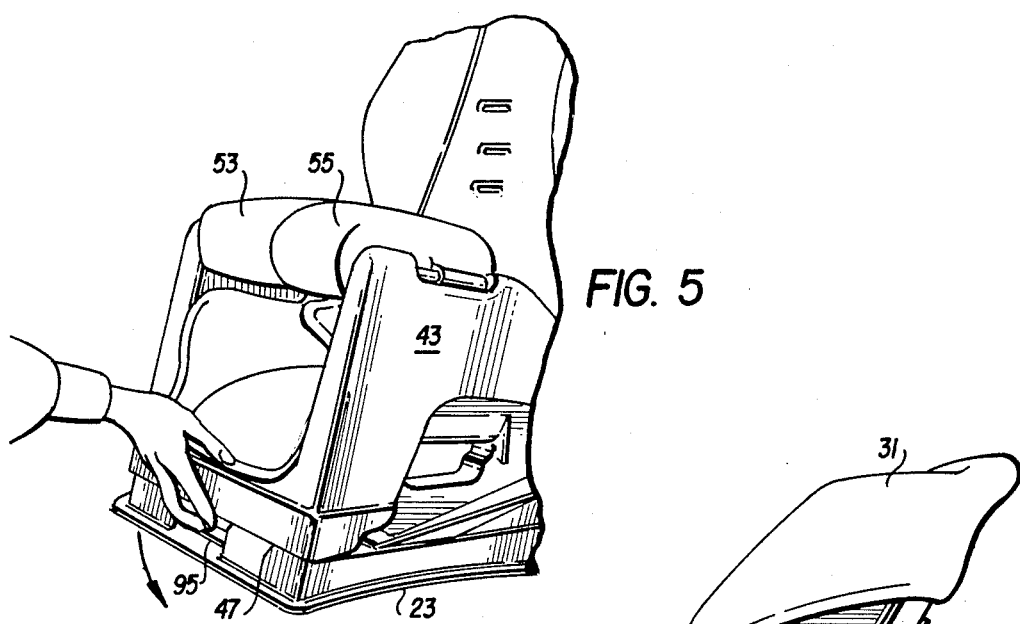
FIG. 5 is a partial perspective view showing the means for adjusting the tilt angle of the car seat of FIG. 1.

As can be seen in FIGS. 3 and 4, base 23 includes opening 93 to provide access to recline lever tab 95. FIG. 5 illustrates the access to lever tab 95 by the operator.

Figure 6:
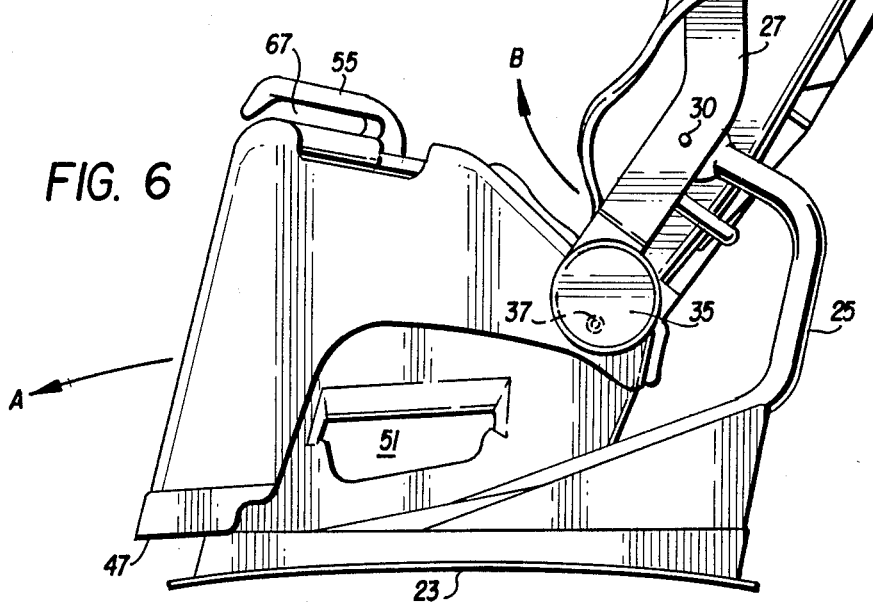
FIG. 6 is a side elevational view of the car seat in its recline position.

When tab 95 is depressed, it permits movement of the booster seat in the direction of arrow A, FIG. 6, as base 47 slides on base 23. Such movement also causes back portion 43 to move angularly about pivots 30 and 37, as indicated by arrow B, since arm 27 is pivoted to the upper support 25, with frame member 25 being rigidly fixed to base 23. This places the seat in the recline position of FIG. 6 as opposed to the upright position illustrated in FIG. 2.

Figure 7:
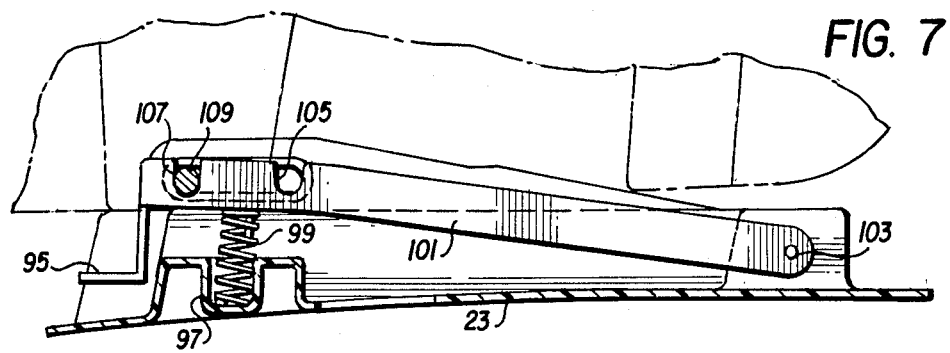
FIG. 7 is a partial sectional view illustrating the recline mechanism.

Turning to FIG. 7, a cross-sectional view illustrates the mechanics of recline lever tab 95. Base 23 includes recess 97, which supports and retains spring 99. Spring 99 is secured to arm 101, which is pivoted to the base at pivot 103. The terminal end of arm 101 includes spaced recesses 105 and 107, in which pivot rod 109 rests. Pivot rod 109 is shown more clearly in FIG. 10 and will be discussed relative to that figure. With pivot rod 109 in position within recess 107, as illustrated in FIG. 7, the car seat is in the recline position, as shown in FIG. 6. When recline lever tab 95 is depressed against bias of spring 99, arm 101 pivots about pivot point 103 so as to lower the forward part of the arm below the level of pivot rod 109. Subsequent movement of the seat to the right, as shown in the drawings, will move rod 109 to the right and allow it to drop into recess 105, thus placing the seat in the upright position of FIG. 1. If the seat is being returned to the position shown in FIG. 7, the procedure is the same with the exception that the seat is then moved to the left.

Figure 8:
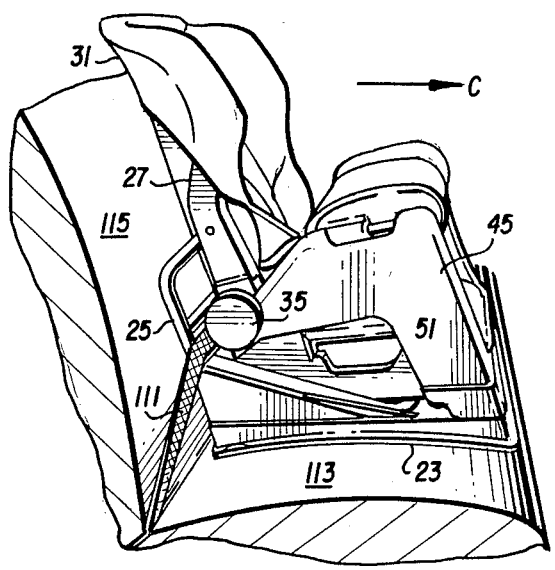
FIG. 8 is a perspective view showing the car seat of FIG. 1 in the forward riding position on an automobile seat.

FIG. 8 shows the proper use of the auto seat belt 111 when the car seat of FIG. 1 is placed in the forward position indicated by arrow C. If a shoulder harness is also integral with or attached to seat belt 111, it, too, passes inside of frame 25. Thus, the seat belt, when properly tightened, retains the car seat in position on the automobile seat.

Figure 9:
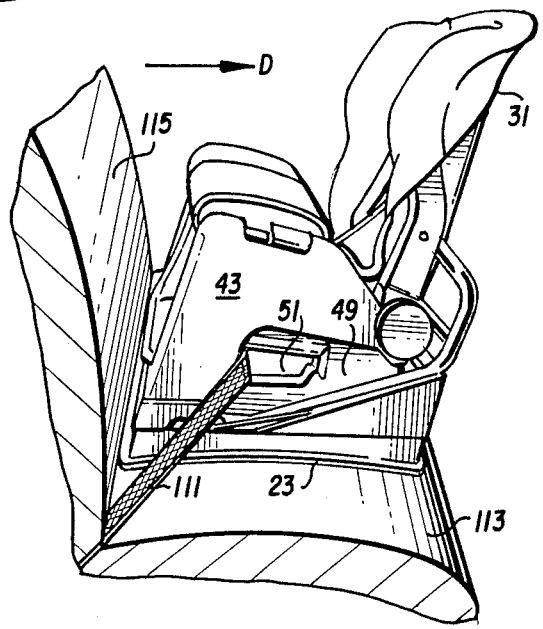
FIG. 9 is a perspective view showing the car seat of FIG. 1 used in a rearward facing position on the automobile car seat.

FIG. 9 illustrates the use of the car seat in the rearward facing direction, with the movement of the car being as shown by arrow D. In this situation, automobile seat belt 111 and shoulder harness, if used, pass through tunnel 51 in rear base 49 of the booster seat and is secured to the female section of the auto seat on the other side thereof. Again, with the auto seat belt being properly secured, the car seat is held in the proper and safe condition on the automobile seat.

Turning now to FIGS. 10 and 11, there is illustrated the means for removing the booster seat 41 from the frame and back of the car seat. The seat is preferably tilted towards one side so as to expose holes 119, which contain pivot rod 109. By pressing down on recline lever tab 95, the rod is released, as will be evident from a review of FIG. 7. Rod 109 may then either by shaken out or pushed out and removed, as indicated by arrow G. FIG. 10 further illustrates that pivot bolt 37 has been removed from bolt hole 121 so as to release the back part of the booster seat from the frame structure. As shown in FIG. 11, the booster seat may then be lifted in the direction as shown by arrow E and pulled forward in the direction as shown by arrow F so as to completely remove it from the frame and back of the car seat.

FIG. 12 is an illustration of the booster seat when it has been freed from the car seat, with the pertinent elements of the car seat being illustrated in dotted lines so as to show the relationship between the two parts.

Figure 13:
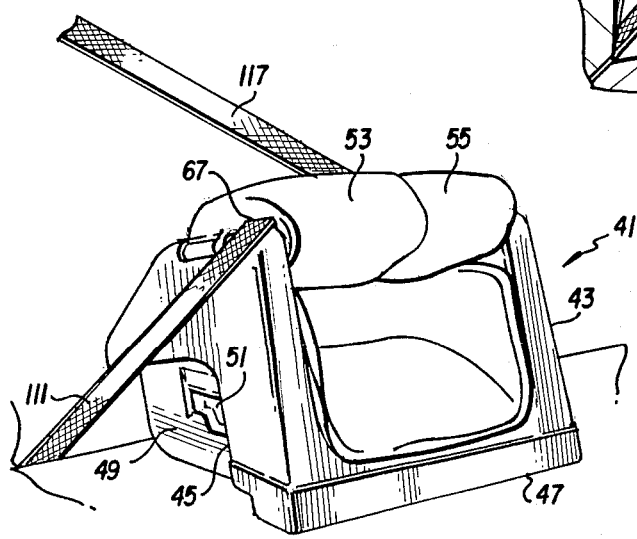
FIG. 13 is an illustration of the use of the automobile seat and shoulder harness for use with the booster seat of FIG. 12.

FIG. 13 illustrates the proper method of securing the booster seat to the automobile seat. As will be obvious, when the booster seat is used, the crotch strap separates from the harness straps and the harness straps are retained with the back of the car seat. Auto seat belt 111 passes through the tunnel and exits on the far side, where it is joined with the shoulder harness 117, with both elements being secured to the female section of the automobile latching mechanism. When the booster seat is used, the child is elevated enough by the booster seat so that use of shoulder strap 117 is proper in the same manner as it is used by an adult. Alternately, the automobile seat belt could be passed through channel 51 so as to secure the booster seat in position on the automobile seat.

FIG. 14 illustrates the shield structure in more detail. In this view, the shields are partially open so as to illustrate tunnel sections 68 and 70, which create through tunnel 67. As can be seen, plate 89 and slot 91 are in transverse alignment. FIG. 15 shows plate 19 passing through slot 91 as flange 65 mates with recess 63. Thus, the shield sections are mated and held in such position by the crotch strap when the car seat or booster seat is used.

As will now be obvious, the present invention provides a car seat which is useful from the infant stage to a child of approximately seven years of age, which covers the entire span of time that additional equipment is needed to properly protect a child riding in an automobile. The ease with which the booster seat is removed and used provides a convenient and economical means for purchasing a single car seat for use over the entire period of a child's growth during which an additional seat is required.

It is to be understood that the above description and drawings are illustrative only, since various modifications and substitutions could be made in the apparatus disclosed without departing from the invention, the scope of which is to be limited only by the following claims:

I claim:

1. A child's car seat comprising
   a first base;
   frame means mounted on said first base;
   a back pivotally mounted on said frame means and extending about said base;
   seat means having a seat base and side panels extending above either side of said seat base;
   shield means pivotally mounted between upper edges of said side panels and rotatable between a raised and lowered position; and
   means for removably securing said seat means to said first base and said back.

2. The car seat of claim 1 further comprising
   shoulder harness straps secured at one end thereof to said frame means and passing through said back; and
   means for removably securing the other ends of said shoulder harness straps to said shield means.

3. The car seat of claim 1 wherein said shield means comprises
   a first section rotatably mounted to one of said side panels;
   a second section rotatably mounted to the other of said side panels;
   a recess in the underside of said first section; and
   a flange extending from said second section mateable with said recess when said sections are in said lowered position.

4. The car seat of claim 3 further comprising
   a crotch strap secured at one end thereof to said frame means and removably extending through said seat; and
   latch means for releasably securing the other end of said crotch strap to said shield means when said shield means is in said lowered position.

5. The car seat of claim 4 wherein said latch means comprises
   first and second interlocking parts, one of said parts being secured to the said other end of said crotch strap and the other of said parts being secured within said recess and passing through said flange when said sections are in their lowered position, whereby said parts may be mated when said sections are in said lowered position.

6. The car seat of claim 3 wherein said sections are slidably mounted on said sides so as to be movable in a direction toward and away from said back.

7. The car seat of claim 3 further comprising
   a tunnel extending through each of said first and second sections, said tunnels mating when said sections are in said lowered position whereby an auto seat belt can pass through said tunnels when said seat means is removed from said back and said frame means and placed on an automobile seat.

8. The car seat of claim 7 further comprising
   spring means secured between one of said sections and its associated side panel for biasing said section in said raised position.

9. The car seat of claim 1 wherein said back is rotatably moveable on said frame means and said seat means is slidable on said base and further comprising
   means for releasably locking said seat means in a plurality of positions relative to said first base; and
   means for removably connecting said seat means to said back so that said back adjusts to predetermined angles relative to said seat means when said seat means is removed to selected ones of said plurality of positions.

10. The car seat of claim 9 wherein said means for releasably locking said seat means in a plurality of positions comprises
    a removable rod for securing said seat means to said base;
    an arm pivotally connected to said seat base and extending forwardly beneath said rod;
    a plurality of notches in said arm for selectively mating with said rod;
    a spring connected between said base and said arm, said spring biasing said arm toward said rod; and
    a lever tab connected to the terminal end of said arm whereby downward pressure on said tab overcomes the bias of said spring so as to permit sliding movement of said seat so that said rod can mate with a selected one of said notches.

11. The car seat of claim 9 wherein said means for interconnecting said seat means and said back comprises
    removable pivot bolts interconnecting said seat means with said back.

12. The car seat of claim 1 wherein said means for removably securing said seat means to said first base and said back comprises
    removable pivot bolts connecting said seat means to said back; and
    a removable rod connecting said seat to said base.

13. The car seat of claim 1 wherein said frame means is configured so as to permit passage of an auto seat belt between said frame means and said back when said car seat is placed in a forward riding position on an auto seat.

14. The car seat of claim 1 further comprising
    a channel extending laterally through said seat base so as to permit passage of an auto seat belt therethrough when said car seat is placed in a rearward riding position on an auto seat.

15. The car seat of claim 1 further comprising
    a tunnel extending through said shield to permit passage of an auto seat belt therethrough when said seat means is removed from said back and said frame means and placed on an automobile seat.

16. The car seat of claim 1 further comprising
    spring means secured between one of said side panels and said shield means for biasing said shield means in said raised position.

17. The car seat of claim 1 further comprising
    a channel extending laterally through said seat base so as to permit passage of an auto seat belt there through when said seat means is removed from said back and said frame means and placed on an automobile seat.

* * * * *